US005348233A

United States Patent [19]

Press et al.

[11] Patent Number: 5,348,233

[45] Date of Patent: Sep. 20, 1994

[54] HIGH VOLUME GASEOUS FUEL INJECTOR

[75] Inventors: Roman J. Press, Rochester; James O. Wilson, Perry, both of N.Y.

[73] Assignee: General Motors Corporation, Detroit, Mich.

[21] Appl. No.: 25,048

[22] Filed: Mar. 1, 1993

[51] Int. Cl.[5] .......... F16K 31/06; B05B 1/30

[52] U.S. Cl. .......... 239/585.3; 251/129.16

[58] Field of Search .......... 239/585.1, 585.3; 251/129.16

[56] References Cited

U.S. PATENT DOCUMENTS

| | | | |
|---|---|---|---|
| 2,881,980 | 4/1959 | Beck et al. | 239/585.3 X |
| 4,347,823 | 9/1982 | Kessler et al. | 123/472 |
| 4,572,436 | 2/1986 | Stettner et al. | 239/585.3 X |
| 4,807,812 | 2/1989 | Renowden et al. | 239/585.3 X |
| 4,813,610 | 3/1989 | Renowden | 239/585.3 X |
| 4,883,252 | 11/1989 | Mesenich | 239/585.3 X |
| 4,958,773 | 9/1990 | Stettner et al. | 239/584 |
| 4,958,774 | 9/1990 | Taylor | 239/584 |

*Primary Examiner*—Andres Kashnikow
*Assistant Examiner*—Lesley D. Morris
*Attorney, Agent, or Firm*—Karl F. Barr, Jr.

[57] ABSTRACT

A fuel injector has a flat armature/valve controlling fuel flow through an opening in a valve seat. The valve seat comprises a raised annular land with a cylindrical opening extending therethrough to define a substantially cylindrical outlet for the passage of fuel having a substantial flow area.

2 Claims, 1 Drawing Sheet

HIGH VOLUME GASEOUS FUEL INJECTOR

TECHNICAL FIELD

This invention relates to a fuel injection system for an internal combustion engine and, more particularly, to a fuel injection system for use with gaseous fuels having a need for high volume flow rates and low noise.

BACKGROUND

Electromagnetic fuel injectors are used in fuel injection systems for internal combustion engines because of the capability of this type of injector to effectively control the discharge of a precise metered quantity of fuel per unit time to an engine. In developing fuel injectors for use with gaseous fuels, such as compressed natural gas, it is desirable to maximize the size of the metering orifice in the injector since injector armature travel or lift is typically limited to preserve injector magnetic performance.

DESCRIPTION OF THE PREFERRED EMBODIMENT

Figure 1:
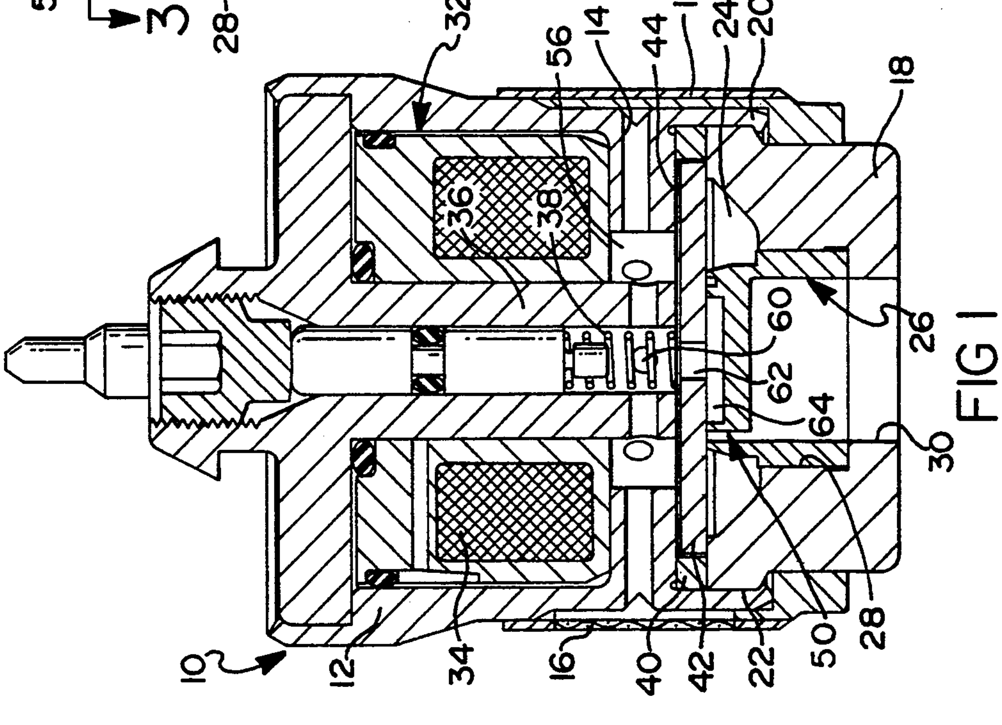
FIG. 1 is a section view of a fuel injector in accordance with this invention.

Referring to the drawing, an injector 10 has a body 12 that receives fuel through a plurality of radial inlet passages 14 surrounded by a filter 16. A base 18 is fixed to the lower end as viewed in FIG. 1 of body 12 as by crimping of the skirt portion 20 of body 12 about shoulder 22 of the base 18. The body 12 and base 18 define a fuel cavity 24 therebetween which is fluidly connected to the radial inlet passages 14 and is adapted to deliver fuel through valve seat means 26 disposed in outlet 28 of fuel cavity 24 which is fluidly connected to an outlet passage 30 in the base 18 of the injector 10.

The injector 10 further includes a solenoid actuator 32 having a coil 34, a center pole 36 surrounding a biasing member such as spring 38, a spacer ring 40 surrounding an armature/valve member 42 and sandwiched with a non-magnetic shim 44 between body 12 and base 18. When coil 34 is energized, armature/valve 42 is lifted from its seated position against valve seat means 26 allowing fuel to flow through the valve seat means and to the fuel outlet passage 30.

Figure 3:
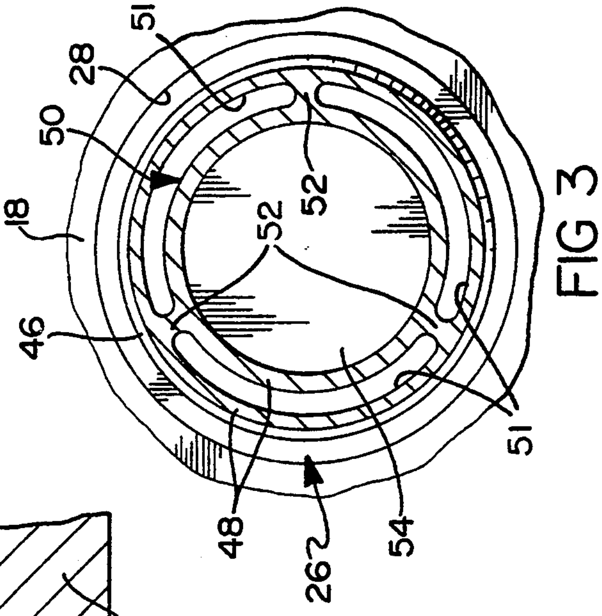
FIG. 3 is a partial sectional view of the injector of FIG. 1 taken along line 3—3 of FIG. 2.
Figure 2:
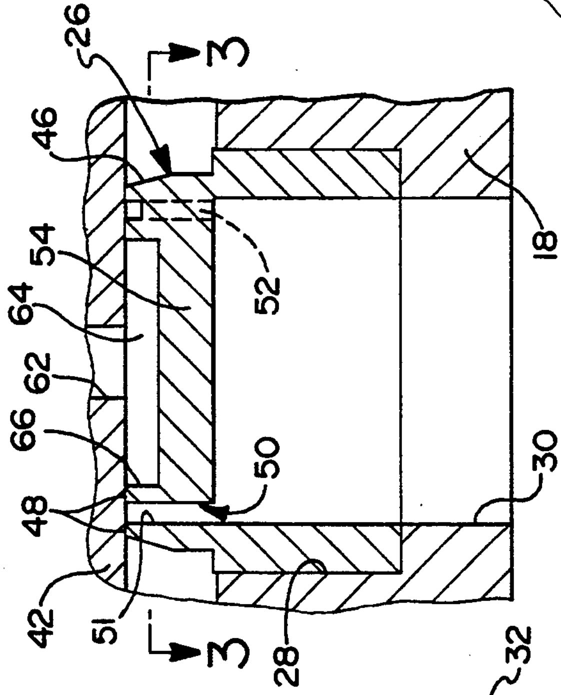
FIG. 2 is an enlarged, partial sectional view of the valve seat of the injector of FIG. 1.

Valve seat means 26, illustrated in detail in FIGS. 2 and 3, comprises a hardened insert which is press fit, or otherwise fixed in outlet 28 of base 18. Extending circumferentially about the upper portion of the valve means 26 is a raised annular land 46 which defines a valve seating surface 48 on which armature/valve 42 is biased into a normally seated position by spring 38. The raised annular land 46 has a substantially annular opening 50 extending therethrough along its circumference. Radial arms 52 support the center portion 54 of the valve seat means 26 and effectively segment the annular opening 50 into arcuate openings 51. Openings 51 define a substantially annular flow passage through the valve seat means 26 for movement of fuel from the fuel cavity 24 to the fuel outlet passage 30 upon displacement of the armature/valve 42 from its seated position on valve seating surface 48. Segmented annular opening 50 provides substantial flow area through the valve seat means 26 while injecting the fuel in a cylindrical pattern.

Radial inlet passages 14 supply fuel to the fuel cavity 24 through passages 56 which direct incoming fuel around the sides of the armature valve. In addition, openings 60 in the side surface of the center pole 36 allow fuel to flow through the pole piece 36 and through opening 62 in the armature/valve 42. The fuel flowing through armature/valve opening 62 enters fuel supply region 64 above the valve seat center portion 64 which is defined by the inner side surface 66 of raised annular land 26. Supply of fuel to the fuel cavity 24 through passages 56 and to the fuel supply region 64 through opening 62 in the armature/valve 42 permits fuel to be supplied to flow passage 50 from both sides of land 46 thereby maximizing fuel flow through the valve seat means 26.

The injector 10 may also employ the invention set forth in U.S. Pat. Application Ser. No. 08/025,049 filed on Mar. 1, 1993 and assigned to the assignee of the present invention.

The foregoing description of the preferred embodiment of the invention has been presented for the purpose of illustration and description. It is not intended to be exhaustive, nor is it intended to limit the invention to the precise form disclosed. It will be apparent to those skilled in the art that the disclosed embodiments may be modified in light of the above teachings. The embodiments described were chosen to provide an illustration of the principles of the invention and its practical application to thereby enable one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

The embodiments of the invention in which an exclusive property or privilege is claimed are defined as follows:

1. A gaseous fuel injector comprising a body and a base fixed together and defining a fuel cavity therebetween, said fuel cavity having a fuel inlet terminating therein and a fuel outlet connecting said fuel cavity to a fuel outlet passage, said fuel outlet having an armature/valve seat disposed therein, said valve seat comprising an annular land having a substantially annular opening extending therethrough for the passage of fuel from said fuel cavity to said fuel outlet passage, an armature/valve biased to engage said valve seat to interrupt fuel delivery through said substantially annular opening, a valve actuator in said injector body adapted to displace said armature/valve from said valve seat to allow fuel delivery from said fuel cavity through said substantially annular opening to said fuel outlet passage.

2. A gaseous fuel injector comprising a body and a base fixed together to define a fuel cavity therebetween, said fuel cavity having a fuel inlet terminating therein and a fuel outlet connecting said fuel cavity to a fuel outlet passage, said fuel outlet having valve seat means disposed therein, said valve seat means comprising a raised annular land having a segmented annular opening therethrough defining an outlet for the passage of fuel from said fuel cavity to said fuel outlet passage, said valve seat means further comprising a fuel supply region defined radially inwardly of said land, an armature/valve biased to engage said valve seat means to interrupt fuel delivery through said outlet, said armature/valve having an opening therethrough corresponding to said fuel supply region of said valve seat means, a valve actuator in said injector body adapted to displace said armature/valve from said valve seat to allow fuel delivery from said fuel cavity and said fuel supply region through said outlet in said valve seat means to said fuel outlet passage.

* * * * *